United States Patent
Rychlak

(10) Patent No.: US 6,917,800 B1
(45) Date of Patent: Jul. 12, 2005

(54) METHOD FOR UPDATING INFORMATION STORED IN A COMMUNICATIONS TERMINAL DEVICE INTENDED FOR MOBILE USE AND COMMUNICATIONS TERMINAL DEVICE

(75) Inventor: Stefan Rychlak, Ilsede (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,361

(22) PCT Filed: Nov. 12, 1998

(86) PCT No.: PCT/DE98/03317

§ 371 (c)(1),
(2), (4) Date: Jul. 6, 2000

(87) PCT Pub. No.: WO99/26351

PCT Pub. Date: May 27, 1999

(30) Foreign Application Priority Data

Nov. 14, 1997 (DE) ......................................... 197 50 364

(51) Int. Cl.[7] .............................................. H04M 3/00
(52) U.S. Cl. ...................... 455/418; 455/419; 455/423; 455/569.2; 455/186.1; 701/115; 701/1
(58) Field of Search ................................. 455/418–420, 455/422.1, 424, 569.2, 186.1, 567, 556.1; 701/1, 29, 32, 115

(56) References Cited

U.S. PATENT DOCUMENTS

| | | | | |
|---|---|---|---|---|
| 5,012,234 A | * | 4/1991 | Dulaney et al. ........... 340/7.39 |
| 5,414,751 A | * | 5/1995 | Yamada ...................... 455/418 |
| 5,442,553 A | * | 8/1995 | Parrillo ....................... 455/420 |
| 5,507,009 A | * | 4/1996 | Grube et al. ................ 455/419 |
| 5,797,088 A | * | 8/1998 | Stamegna .................... 455/345 |
| 5,848,064 A | * | 12/1998 | Cowan ........................ 370/338 |
| 5,896,566 A | * | 4/1999 | Averbuch et al. ............ 455/419 |
| 6,009,355 A | * | 12/1999 | Obradovich et al. .......... 701/1 |
| 6,070,053 A | * | 5/2000 | Yamashita .................. 340/7.58 |
| 6,075,998 A | * | 6/2000 | Morishima .................. 455/567 |
| 6,272,333 B1 | * | 8/2001 | Smith .......................... 455/418 |
| 6,324,411 B1 | * | 11/2001 | Genell ......................... 455/561 |
| 6,381,454 B1 | * | 4/2002 | Tiedemann et al. ......... 455/419 |

FOREIGN PATENT DOCUMENTS

| | | |
|---|---|---|
| EP | 0 706 295 | 4/1996 |
| WO | WO 97 16938 | 5/1997 |

* cited by examiner

*Primary Examiner*—Emmanuel L. Moise
*Assistant Examiner*—Kamran Afshar
(74) *Attorney, Agent, or Firm*—Kenyon & Kenyon

(57) ABSTRACT

A method and a communications terminal device intended for mobile use are described, with or in which it is possible in a simple manner to update information stored in the device, for example, components of the system software required for the operation of the device.

A communications terminal device is distinguished by a nonvolatile overwritable or erasable and rewritable memory, the information in which can be replaced and/or supplemented via a connection, preferably a radio link, between communications terminal device and a provider offering updated information.

An updating can be initiated on the request of the user of the device or also by the device manufacturer.

29 Claims, 2 Drawing Sheets

METHOD FOR UPDATING INFORMATION STORED IN A COMMUNICATIONS TERMINAL DEVICE INTENDED FOR MOBILE USE AND COMMUNICATIONS TERMINAL DEVICE

BACKGROUND INFORMATION

The invention proceeds from a method for updating information stored in a communications terminal device intended for mobile use, in particular in a car radio with an integrated mobile telephone, and a communications terminal device.

Conventional communications terminal devices such as mobile telephones or even car radios are as a rule controlled by operating programs stored in the devices. In the named devices, to such operating programs are as a rule stored in a microprocessor for controlling the device's functions or in a non-volatile read-only memory (ROM) connected to the microprocessor. A modification or supplementation of the system software of such devices is, if provided for at all, only possible by exchanging the processors or memory components containing the software after opening the device.

Thus, for example, car radios that have an integrated mobile telephone in addition to the actual car radio function are known, for example, from the brochure "Programm 97—Sound und Fahrvergnügen pur. Mobile Kommunikation von Blaupunkt [Program 97—Pure Sound and Driving Pleasure. Blaupunkt Mobile Communications]" from Blaupunkt under the name RadioPhone, for example, the model "Amsterdam TCM 127." In this device also, in which a large share of the available functions are implemented in the form of operating programs, the required software components are stored in a non-volatile read-only memory, so that later modification or supplementation of the device software as well as later augmentation of the device's functionality is not possible.

In contrast, a communications terminal device according to the present invention has the advantage that the information stored in the device, thus including, for example, the operating program of a car radio, can be replaced or supplemented on the request of the device user at a later time by downloading the necessary information to the communications terminal device from an information provider connected to the communications terminal device.

In this connection, it is particularly advantageous if the communications terminal device has a transceiver, for example, a mobile telephone, since in such a case, the information stored in the device can be updated wherever the device according to the present invention may be located. Thus in the case of a car radio, for example, this avoids the expense of removing the device from the motor vehicle and the associated risk of damaging it as well as the expense of taking the device to an authorized service facility having the necessary means for updating the information stored in the device.

Moreover, it is advantageous if the device according to the present invention has a display device for displaying the information made available by an information provider since this makes it easier for the user of the device according to the present invention to select the necessary or desired information components for updating the information stored in the device.

The method according to the present invention has the advantage that a later updating of the information stored in a device according to the present invention is made possible in a simple manner. Thus, for example, via the method according to the present invention, it is possible to make updated or debugged versions of the system software of a device according to the present invention accessible to the device in a simple manner. Such updating of the system software, for example, is of particular advantage if, the information stored in the device according to the invention is updated solely at the instigation of the information provider, for example, the device manufacturer, without user intervention.

With the method according to the present invention, it is also possible, for example, to increase the range of function of a communications terminal device even later by downloading the software components required for this. This eliminates the necessity for the user to purchase a completely new device in the event that he desires increased functionality in his equipment. Finally, the method according to the invention also makes it possible for the user of the device to request interesting information for a short period of time, such as updated data for a motor vehicle navigation system in which, for example, new traffic routes or even long-term construction sites are included.

In order to facilitate the selection of the information made available by a service provider, it is of advantage if a list of the available information is transmitted to the communications terminal device and displayed there after a connection has been established between the communications terminal device and the information provider.

DETAILED DESCRIPTION

The device present invention and the method according to the invention will be explained below using a car radio with an integrated mobile telephone as an example which will be identified in the following as "radio phone" based on the product designation "RadioPhone" selected in the Blaupunkt brochure mentioned above. However, this should not be understood to be a limitation of the invention to the effect that it might be limited to radio phones. Rather, it is also provided for the method according to the invention to be applied to other electronic devices intended for mobile use such as, for example, mobile telephones and transceivers in general, car radios and motor vehicle navigation systems.

Figure 1:
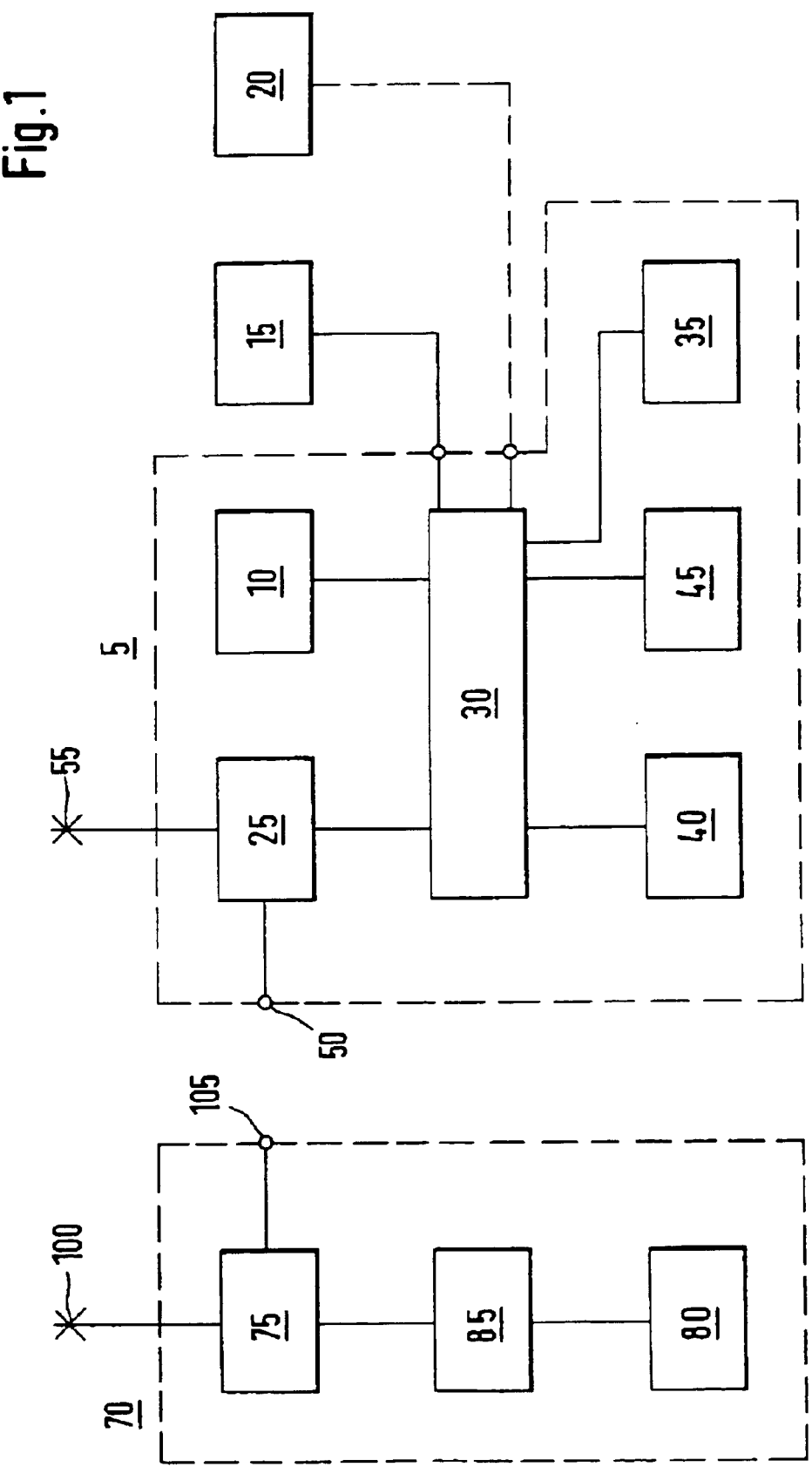
FIG. 1 shows a block circuit diagram of a communications terminal device according to the present invention and an information provider.

A device according to the present invention in the form of a radio phone is shown schematically in FIG. 1. The device according to the present invention contains a central microprocessor 30 to control at least some of the components of device 5 that are connected to it, as in the present case, a radio receiver 10, a motor vehicle navigation system 15 connected externally to device 5 in addition and a mobile telephone 25, which in the present exemplary embodiment assumes the functions of a transmitter/receiver unit 25 necessary for implementing the method according to the invention.

To control the various functions of device 5 and components 10, 15 and 25 contained in it and connected to it externally, the microprocessor accesses a nonvolatile memory 40 in which is stored the information necessary to operate the functions and components of the device, i.e., operating programs, and, for example, station tables for the broadcast receiver and data for the navigation system in the form of an electronic map. Nonvolatile memory 40 is implemented in the present case as an erasable and rewritable memory in the form of a FLASH-EPROM so that the information stored in it can be overwritten and/or supplemented without mechanical interventions into device 5.

In addition, a control panel 35 is connected to microprocessor 30, the control panel including the control elements required for operating the functions and components of the device as well as the external components which are connected or can be connected to the device, and a display unit to display the operating state of the device. Finally, microprocessor 30 is also connected to a nonvolatile read-only memory (ROM, 45) in which are stored the routines required to implement the method according to the present invention.

FIG. 1 also shows a provider 70 for current information which can be retrieved via radio phone 5 to update or supplement the information stored in radio phone 5.

In the present exemplary embodiment, provider 70 is a service facility of the device manufacturer, for example, Blaupunkt. For example, the device manufacturer makes available updated versions of the operating programs necessary for the operation of radio phone 5, software modules to increase and/or augment the range of function of terminal device 5 and, for example, updated information for the electronic maps needed to operate motor vehicle navigation system 15 connected to communications terminal device 5 in which, for example, new transport links or prolonged long-term construction sites have been added.

Figure 2:
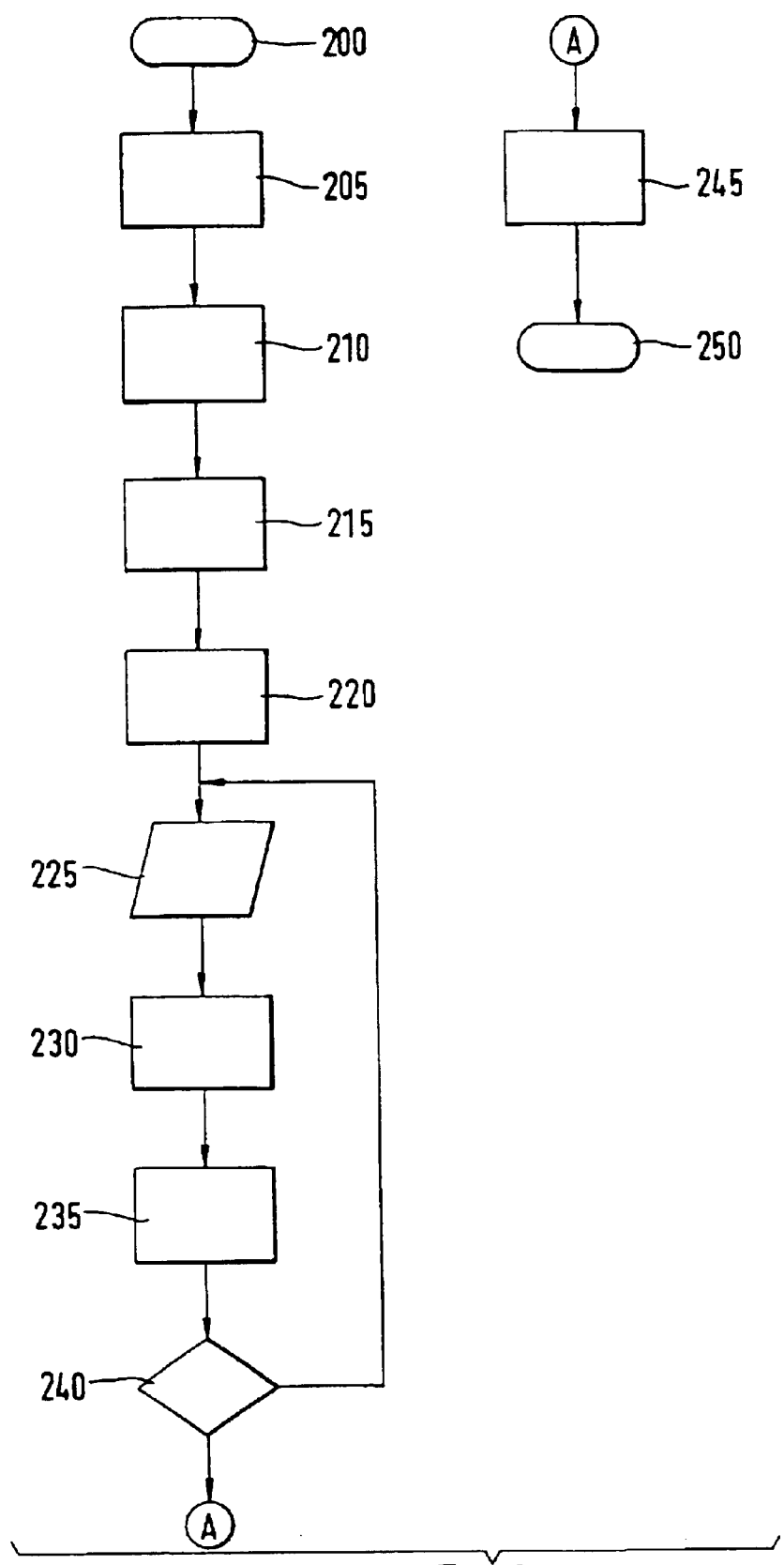
FIG. 2 shows a flow chart of an exemplary embodiment of a method according to the present invention.

To establish a connection between provider 70 and communications terminal device 5 and to communicate with communications terminal device 5, the service provider has a transmitter/receiver unit 75, which in the present exemplary embodiment is a telephone line connected via a modem to a service computer. As indicated in FIG. 2 by transmitter/receiver antenna 100, it can also be dialed via radio, i.e., via a mobile telephone, for example.

Transmitter/receiver unit 75 of provider 70 is connected to a central control unit 85 of the provider, the control unit being responsible for not only the identification of a communications terminal device 5 addressing the provider, but also the control of the necessary steps for establishing the connection on the part of the provider and for communication with the calling communications terminal device 5 as well as the transmission of the information and/or information components selected by communications terminal device 5. In doing so, control unit 85 of information provider 70 uses a memory 80 in which is stored the continuously updated information such as updated system software for radio phone 5 and routines for supplemental functions such as, for example, the control of components that can be connected externally to device 5.

The operational sequence of the method according to the present invention for updating the information stored in communications terminal device 5 will be explained below with reference to the flow chart shown in FIG. 2.

The necessity for supplementing the system software of an existing devices 5 arises, for example, when a car radio and/or radio phone user would like to expand his device by installing an external compact disc player, CD changer for short; however, the device does not have the software components needed to control it.

The operational sequence of the method according to the present invention starts with step 200 after the user of device 5 has activated the function "extend range of function" in the control menu, i.e., via a control element in control panel 35 of the device with the readout of the program components required for controlling the operational sequence of the method from read-only memory 45 in which also the address of information provider 70 is stored. In step 205, microprocessor 30 of device 5 according to the invention now initiates the addressing of an information provider 70, in the present case by dialing telephone line 75 of the service facility of the device manufacturer by mobile telephone module 25 of communications terminal device 5 according to the invention which acts in this case as a transmitter/receiver unit 25. If selected information provider 70 is ready to transmit information, the steps required on the part of radio phone 5 and information provider 70 to establish a connection between radio phone 5 and service facility 70, i.e., between mobile telephone module 25 of radio phone 5 and telephone line 75 of the service facility, are now implemented in step 210. For the event that, as in the present case of extension of the device software for the operation of a CD changer, fees are to be charged for the retrieval of information by communications terminal device 5, the calling communications terminal device 5 is identified in an intermediate step 215. In the case of a GSM mobile telephone module 25, for example, such identification enables the identification number stored on the SIM card required for operation of mobile telephone 25, which is reported to information provider 70 via the existing connection between the communications terminal device and provider 70.

After provider 70 identifies communications terminal device 5, in step 220, provider 70 transmits a list of the information made available to it, in the present example a list of the software modules available to the provider for extension of the range of function of device 5 according to the invention, the list being displayed via a display unit of control panel 35 of communications terminal device 5. After the user selects the desired information, in this case the software components required for the operation of the externally connected CD changer, via control panel 35 of radio phone 5 in step 225, information provider 70 transmits the information selected by the user to communications terminal device 5 in step 230 from the provider's service computer via the provider's telephone line, a transmitter station of the mobile telephony network, which in the present case is symbolized by transmitter/receiver antenna 100 of provider 70, transmitter/receiver antenna 55 of communications terminal device 5, mobile telephone module 25 of terminal device 5 which is connected to the antenna, to microprocessor 30 of terminal device 5 which initiates the steps required for supplementation of the information stored in memory 40 and thus in step 235 supplements the operating program of the radio phone by the transmitted new software components.

Via a supplemental request in an intermediate step 240, the user can be granted the option of utilizing the already existing connection between information provider 70 and communications terminal device 5 to retrieve additional information. If the user desires additional information, which he reports by activating an operating element on control panel 35, the operational sequence returns to step 225, i.e., the user of the device can select additional information.

If, on the other hand, the user desires no additional information, which he also announces in step 240 by activating a control element on control panel 35, the sequence proceeds to step 245 where the connection between the communications terminal device and provider 70 is disconnected. In addition, if the information is subject to charge, the costs for the retrieval are calculated here and an invoice is generated for the customer. The process finally ends with step 250.

If the information retrieved is a chargeable service of provider 70, the fees incurred for it can be charged, for example, via the telephone bill in a manner known per se.

Analogously, it is also possible for communications terminal device 5 according to the present invention to request other information from a service provider 70, such as, for example, manufacturer-updated, i.e., supplemented or, for example, debugged versions of the system software or components of the system software for device 5.

It is also possible to request updated information for electronically stored maps required for the operation of connected motor vehicle navigation system 15 such as, for example new transport links or information concerning prolonged, long-term construction sites. In doing so; it is not necessary to retrieve this information from the device manufacturer as information provider 70 as described, but rather it is also possible to request routes for motor vehicle navigation system 15 from an alternative service provider 70 having such information, such as an auto club or other independent provider.

It is also conceivable that at the start of a long car trip, for example, the user of the device will retrieve up-to-date traffic information concerning the selected route from a provider 70 having such information, the information then being stored in the device's memory which navigation system 15 connected to device 5, for example, can use to calculate an alternate route. In this connection, it is also possible to make the user of the device aware of the retrieved and stored traffic information on request via the display of control panel 35 or also audibly.

For this purpose, it is necessary to enable the software stored in read-only memory 45 for implementing the information update method according to the invention to call a different provider 70 via the device's control panel 35 instead of the default address of the device manufacturer.

While in the case of the aforementioned embodiment, it was assumed that the transmission of updated information from information provider 70 to communications terminal device 5 is initiated by the user of communications terminal device 5, in an alternative exemplary embodiment it is provided that an information provider 70, the device manufacturer in particular, can itself initiate an update of information stored in the device without any action by the user of the device. This procedure proves to be practical when, for example, a device manufacturer has discovered serious faults in the system software of devices distributed by it and it would like to correct them. In such a case, it is possible to avoid a recall which is well-known in the automotive industry and is expensive both for the user as well as the manufacturer of the device.

Another conceivable use is when, for example, a mobile telephone network operator changes details in transmission standards resulting in a need for adapted software for the mobile telephone devices. In this case also, the system software needed for operating the device can be adapted without action by the user and without using the services of a workshop.

The proposed alternative method for updating information stored in terminal device 5 differs from the method described and shown in FIG. 2 in steps 200, 205, 215 to 225 and 240.

As already mentioned, the updating in the present exemplary embodiment is not initiated by the user but rather by the provider so that the operating sequence starts in step 200 with the selection of the devices (models) in which information is to be updated. In the aforementioned case of mobile telephones, this is, for example, all devices in operation which still do not function according to the desired new standard. In step 205, all selected devices are addressed or one after the other is addressed and connections are then established in step 210. Steps 215 to 225 are omitted in this embodiment. The method is thus continued at step 230 with the transmission of the updated information from provider 70 to mobile telephone 5 via which the information stored in the communications terminal device is supplemented and/or replaced in step 235. After the completion of the update (step 240 is omitted), the connection is disconnected at step 245 and the procedure is completed at 250.

An additional exemplary embodiment of the invention addresses the case when, in contrast to the device described in connection with FIG. 1, device 5 according to the invention itself has no radio transmitter/receiver unit. Conventional car radios, for example, represent an example of such devices.

If information stored in such a device is to be updated via the method according to the invention, it is necessary to connect it to an information provider 70 via cables connected to a suitable interface of the device.

The present embodiment provides for the use as the interface of the key card reader known in Blaupunkt car radios and indicated by terminal 50 of transmitter/receiver unit 25 in FIG. 1. For this purpose, a key card emulator, i.e., a dummy key card connected via cables to a service computer via a terminal 105 provided for that purpose, the terminals attached to the surface of the key card emulator being connected to the cables, is inserted into the card reader so that microprocessor 30 of car radio 5 with the mating contacts arranged in the card reader is in contact with the service computer of provider 70.

Aside from the addressing of information provider 70, which is now not required and the likewise superfluous identification of the device, the information stored in device 5 is now updated according to the sequence explained in connection with FIG. 2.

What is claimed is:

1. A method for updating stored information which is stored in a non-volatile memory of a communications terminal device intended for a mobile use, comprising the steps of:

establishing a connection between the communications terminal device and an information provider, the provider having updated information which is addressed by the communications terminal device;

selecting at least parts of the updated information at the communications terminal device;

transmitting only the selected information from the provider to the communications terminal device; and performing at least one of supplementing the stored information with the selected information and replacing the stored information with the selected information, the at least one of supplementing and replacing including storing the selected information in the nonvolatile memory;

wherein the communications terminal device is used in a car radio, the car radio including an integrated mobile telephone.

2. The method according to claim 1, wherein the transmitting step includes the following substep:

identifying the communications terminal device by the information provider.

3. The method according to claim 1, further comprising the step of:
   before the transmitting step, identifying the communications terminal device by the information provider.

4. The method according to claim 2, wherein the communications terminal device is identified by the provider using an identifier, the identifier being assigned individually to the communications terminal device and reported to the provider.

5. The method according to claim 1, further comprising the steps of:
   after the establishing step, transmitting a list of the updated information from the provider to the communications terminal device;
   selecting the selected information from the list of the updated information via one of a control panel of the communications terminal device and a further control panel connected to the communications terminal device; and
   after the selecting step, transmitting the selected information by the provider to the communications terminal device.

6. The method according to claim 1, wherein the selected information includes at least one of an updated version and updated components of an operating program required for an operation of the communications terminal device.

7. The method according to claim 1, wherein the selected information includes components of an operating program which are required for an operation of the communications terminal device and which extend a range of function of the communications terminal device.

8. The method according to claim 1, wherein the selected information includes updated or replacement software.

9. The method according to claim 8, wherein the updated or replacement software is operating program software, and the performing step includes updating or replacing the operating program with the operating program software.

10. The method according to claim 1, wherein the operation of selecting at least parts of the updated information at the communications terminal device is by a user.

11. A method for updating stored information which is stored in a non-volatile memory of a communications terminal device intended for mobile use, comprising the steps of:
    establishing a connection between an information provider and the communications terminal device, the provider having updated information and addressing the communications terminal device which has an individually assigned identifier;
    after the establishing step, selecting at least one of selected information and information components from the updated information to be transmitted from the provider to the communications terminal device; and
    performing at least one of supplementing the stored information with the selected information and replacing the stored information with the selected information, the at least one of supplementing and replacing including storing the selected information in the nonvolatile memory;
    wherein the communications terminal device is used in a car radio, the car radio including an integrated mobile telephone.

12. The method according to claim 11, wherein at least one of the selected information and the information components includes at least one of an updated version and updated components of an operating program required for an operation of the communications terminal device.

13. The method according to claim 11, wherein at least one of the selected information and the information components includes components of an operating program which is required for an operation of the communications terminal device and which extend a range of function of the communications terminal device.

14. The method according to claim 11, wherein the selected information includes updated or replacement software.

15. The method according to claim 14, wherein the updated or replacement software is operating program software for an operating program, and the performing step includes updating or replacing the operating program with the operating program software.

16. A communications terminal device for a mobile use, comprising:
    a transmitter/receiver unit connecting the communications terminal device to a provider to obtain updated information; and
    an information memory arrangement including a nonvolatile memory, at least a part of the nonvolatile memory being overwritable or erasable and rewritable, the nonvolatile memory storing information,
    wherein, when a connection exists between the communications terminal device and the provider, the stored information in the nonvolatile memory is at least one of replaced by selected information and supplemented by the selected information by storing the selected information in the nonvolatile memory, the selected information being selected via the communications terminal device, and
    wherein the communications terminal device is used in a car radio, the car radio including an integrated mobile telephone, the mobile telephone includes the nonvolatile memory for storing the stored information, and wherein the car radio one of (a) includes the transmitter/receiver unit and (b) is connected to the transmitter/receiver unit.

17. The device according to claim 16, wherein the nonvolatile memory stores an operating program which is required for an operation of the mobile telephone.

18. The device according to claim 16, wherein the transmitter/receiver unit includes the mobile telephone.

19. The device according to claim 16, wherein the communications terminal device includes a control panel, the control panel allowing a selection of the selected information from the updated information.

20. The device according to claim 16, wherein the communications terminal device can be connected to a control panel, the control panel allowing a selection of the selected information from the updated information.

21. The device according to claim 16, wherein the communications terminal device includes an additional nonvolatile memory which stores components of an operating program, the components being required for an operation of the communications terminal device and a transmission of the selected information from the provider to the communications terminal device.

22. The device according to claim 21, wherein the additional nonvolatile memory includes a read-only memory.

23. The device according to claim 16, further comprising:
    an output device outputting a list of the updated information.

24. The device according to claim 23, wherein the output device includes a display device, the display device displaying the list.

25. The device according to claim 23, wherein the output device is connected to a display device.

26. The device according to claim 16, wherein the selected information includes updated or replacement software.

27. The device according to claim 26, wherein the updated or replacement software is operating program software.

28. A method for updating stored information which is stored in a non-volatile memory of a communications terminal device intended for mobile use, comprising:

establishing a connection between the communications terminal device and an information provider, the provider having updated information which is addressed by the communications terminal device;

displaying, at the communications terminal device, updated information available from the provider;

selecting, by a user, at least parts of the displayed updated information;

transmitting the selected information from the provider to the communications terminal device; and performing at least one of supplementing the stored information with the selected information and replacing the stored information with the selected information, the at least one of supplementing and replacing including storing the selected information in the non-volatile memory;

wherein the communications terminal device is adapted for mobile use; and wherein the communications terminal device is used in a car radio, the car radio including an integrated mobile telephone.

29. A communications terminal device for a mobile use, comprising:

a transmitter/receiver unit configured to connect the communications terminal device to a provider;

a display coupled to the transmitter/receiver unit and configured to display updated information available from the provider;

a selection device via which a user selects at least some of the available updated information; and an information memory arrangement including a nonvolatile memory, at least a part of the nonvolatile memory being overwritable or erasable and rewritable, the nonvolatile memory storing information, wherein, the transmitter/receiver is configured to receive from the provider the selected information when a connection exists between the communications terminal device and the provider, and wherein the stored information in the nonvolatile memory is at least one of: i) replaced by the selected updated information, and ii) supplemented by the selected information, by storing the selected information in the nonvolatile memory; and wherein the communications terminal device is used in a car radio, the car radio including an integrated mobile telephone.

\* \* \* \* \*

UNITED STATES PATENT AND TRADEMARK OFFICE
CERTIFICATE OF CORRECTION

PATENT NO. : 6,917,800 B1 Page 1 of 1
APPLICATION NO. : 09/554361
DATED : July 12, 2005
INVENTOR(S) : Stefan Rychlak It is certified that error appears in the above-identified patent and that said Letters Patent is hereby corrected as shown below:

On the title of the patent, # (57) Abstract, no paragraph breaks.

Column 1, line 8, change "BACKGROUND INFORMATION" to --FIELD OF THE INVENTION--

Column 1, line 9, change "The invention" to --The present invention--

Column 1, line 14, insert "BACKGROUND INFORMATION"

Column 2, line 7, change "advantage if, the" to --advantage if the--

Column 2, line 41, change "The device present invention and the method" to --The device and the method--

Column 2, line 42, insert "the invention will be" to --the present invention will be--

Signed and Sealed this

Twenty-ninth Day of August, 2006

JON W. DUDAS
*Director of the United States Patent and Trademark Office*